(12) United States Patent
Ju

(10) Patent No.: US 10,928,706 B2
(45) Date of Patent: Feb. 23, 2021

(54) CAMERA DEVICE FOR VEHICLE

(71) Applicant: HYUNDAI MOBIS Co., Ltd., Seoul (KR)

(72) Inventor: Ha Yeon Ju, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/655,725

(22) Filed: Oct. 17, 2019

(65) Prior Publication Data
US 2020/0124944 A1    Apr. 23, 2020

(30) Foreign Application Priority Data

Oct. 22, 2018    (KR) ........................ 10-2018-0125773

(51) Int. Cl.
*G03B 17/08*    (2006.01)
*H04N 5/225*    (2006.01)
*B60R 11/00*    (2006.01)

(52) U.S. Cl.
CPC .............. *G03B 17/08* (2013.01); *B60R 11/00* (2013.01); *H04N 5/2252* (2013.01)

(58) Field of Classification Search
CPC .. G03B 17/08; H04N 5/2252; H04N 5/22521; H04N 5/2257; B60R 11/00; B60R 11/04
See application file for complete search history.

(56) References Cited

U.S. PATENT DOCUMENTS

| | | | |
|---|---|---|---|
| 9,305,446 B1 * | 4/2016 | Clinton | G08B 13/19619 |
| 10,277,786 B1 * | 4/2019 | Leonelli, Jr. | H04N 5/2252 |
| 2014/0252229 A1 * | 9/2014 | Kondo | A61B 6/4283 250/336.1 |

FOREIGN PATENT DOCUMENTS

KR    10-2013-0050629    5/2013

* cited by examiner

*Primary Examiner* — Padma Haliyur
(74) *Attorney, Agent, or Firm* — H.C. Park & Associates, PLC

(57) ABSTRACT

A camera device for a vehicle, including: a camera module that is seated in a housing; a grommet that is installed such that an inner circumferential surface thereof comes into contact with the camera module and an outer circumferential surface thereof comes into contact with the housing; and a cover that is coupled to the housing and the grommet and prevents penetration of moisture along with the grommet.

7 Claims, 4 Drawing Sheets

CAMERA DEVICE FOR VEHICLE

CROSS-REFERENCE TO RELATED APPLICATION

This application claims priority from and the benefit of Korean Patent Application No. 10-2018-0125773, filed on Oct. 22, 2018 which is hereby incorporated by reference for all purposes as if set forth herein.

BACKGROUND

Field

Exemplary embodiments of the present disclosure relate to a camera device for a vehicle, and more particularly, to a camera device for a vehicle capable of directly obstructing an inflow of moisture and reducing a size of a contour thereof by applying a grommet to a front thereof.

Discussion of the Background

In general, camera devices for vehicles are devices that secure an image inside or outside a vehicle body, provide the image to a driver, enlarge a field of view of the driver, and thereby assist in enabling the driver to recognize situations inside or around the vehicle. Especially, recent camera devices for vehicles capture images of surroundings of a vehicle to provide convenience of driving or parking to a driver.

The conventional camera devices for vehicles have a problem in that the camera devices do not sufficiently prevent penetration of moisture when exposed to an environment in which a hydraulic pressure is high.

The background art of the present disclosure is disclosed in Korean Unexamined Patent Application Publication No. 2013-0050629 (published on May 16, 2013 and entitled "CAMERA DEVICE FOR VEHICLE").

The above information disclosed in this Background section is only for enhancement of understanding of the background of the invention and, therefore, it may contain information that does not constitute prior art.

SUMMARY

Various embodiments are directed to a camera device for a vehicle capable of directly obstructing an inflow of moisture and reducing a size of a contour thereof by applying a grommet to a front thereof.

In an embodiment, a camera device for a vehicle includes: a camera module that is seated in a housing; a grommet that is installed such that an inner circumferential surface thereof comes into contact with the camera module and an outer circumferential surface thereof comes into contact with the housing; and a cover that is coupled to the housing and the grommet and prevents penetration of moisture along with the grommet.

In the embodiment, the camera module may include: a rear body that is inserted into the housing; a printed circuit board that is installed on the rear body; a front body that is disposed in front of the printed circuit board, is coupled to the rear body, and is inserted into the grommet; and a lens that is inserted into the front body.

In the embodiment, the printed circuit board may be coupled to the front body by bonding, and be connected to a cable module in the rear body.

In the embodiment, the printed circuit board may be inserted into the rear body, and an edge section of the front body may be coupled to the rear body.

In the embodiment, the front body may be formed in a hollow shape to house the lens in a central portion thereof.

In the embodiment, one or more first adhesion protrusions, which come into contact with an outer circumferential surface of the front body and prevent penetration of moisture, may be formed on the inner circumferential surface of the grommet.

In the embodiment, the inner circumferential surface of the grommet may have a circular hole formed in a central portion of the grommet.

In the embodiment, one or more second adhesion protrusions, which come into contact with an inner circumferential surface of the housing and prevent the penetration of moisture, may be formed on the outer circumferential surface of the grommet.

In the embodiment, a hydraulic transmission protrusion, which comes into contact with the grommet, transmits a hydraulic pressure applied to the cover to the grommet, and raises adhesion of the first and second adhesion protrusions of the grommet, may be formed at the cover.

In the embodiment, an O-ring which prevents penetration of moisture may be installed between the front body and the lens.

In the embodiment, the grommet may be installed in the front of the camera module.

The camera device for a vehicle according to the present disclosure can directly obstruct an inflow of moisture and reduce a size of a contour thereof by applying the grommet to a front thereof.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
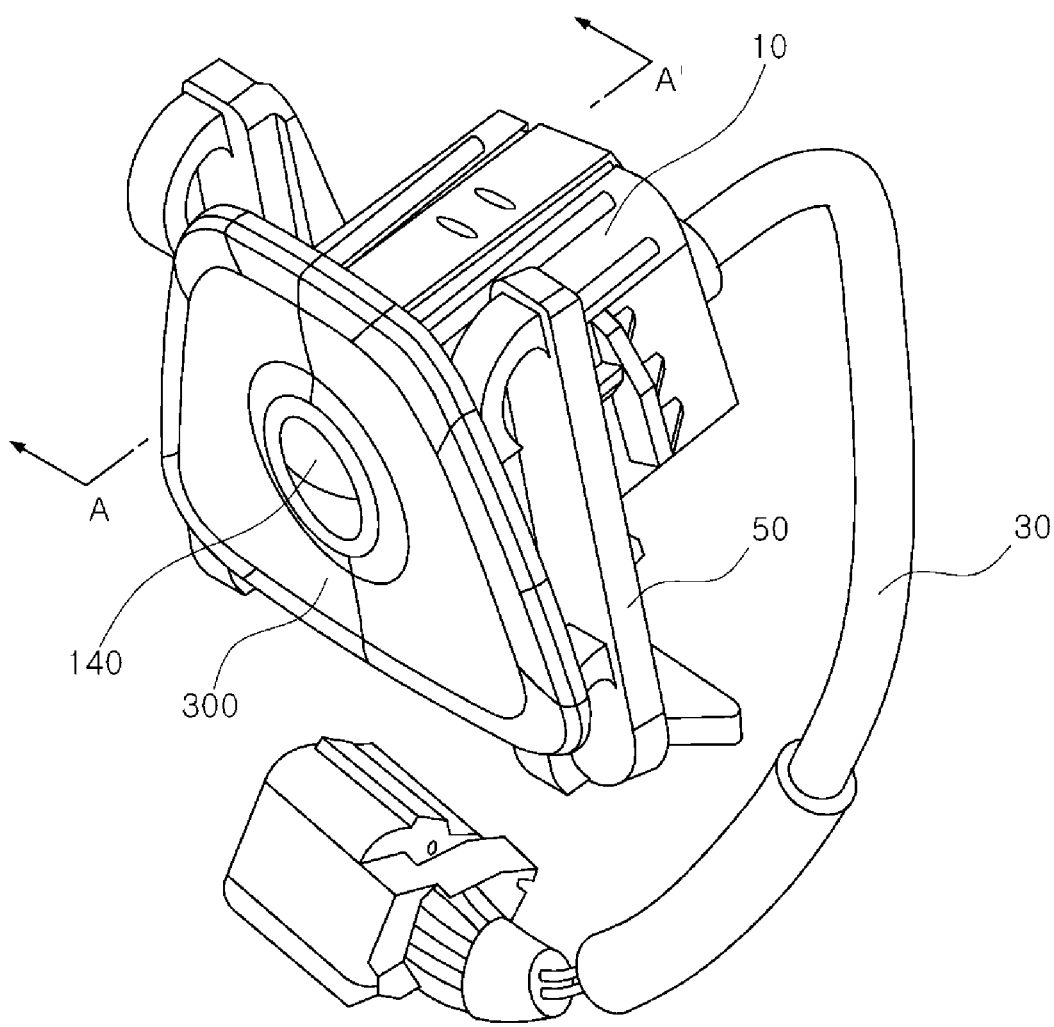
FIG. 1 is a perspective view schematically illustrating a camera device for a vehicle according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereinafter, a camera device for a vehicle will be described with reference to the accompanying drawings through various examples of embodiments. In the drawings, thicknesses of lines, sizes of components, etc. may be exaggerated for clarity and convenience of description. Further, technical terms, as will be mentioned below, are terms defined in consideration of functions thereof in the present disclosure, which may be varied according to the intention of a user or an operator, practice, or the like. Therefore, the terms should be defined on the basis of the contents of this specification.

Figure 2:
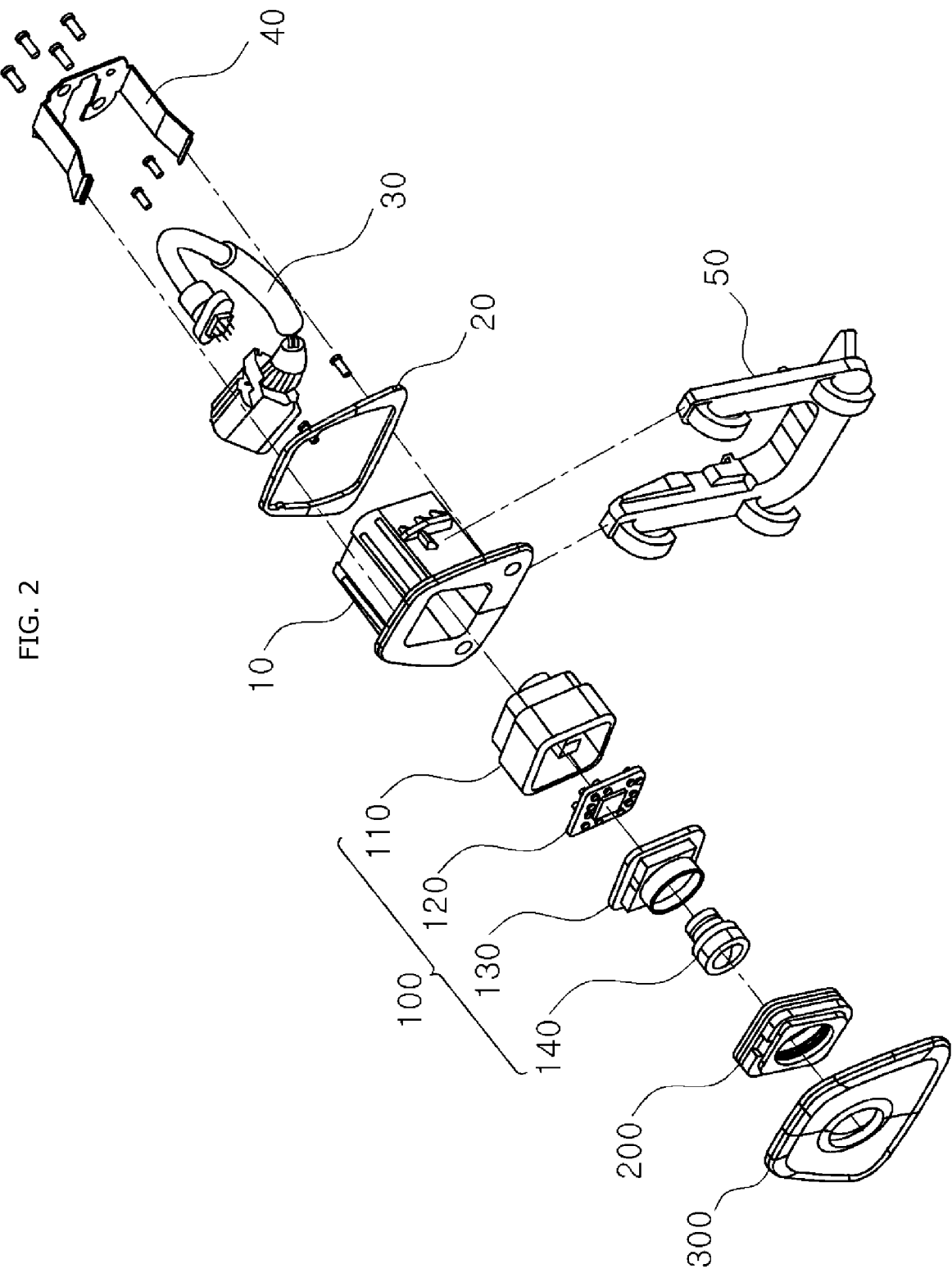
FIG. 2 is an exploded perspective view schematically illustrating the camera device for a vehicle according to the embodiment of the present disclosure.
Figure 3:
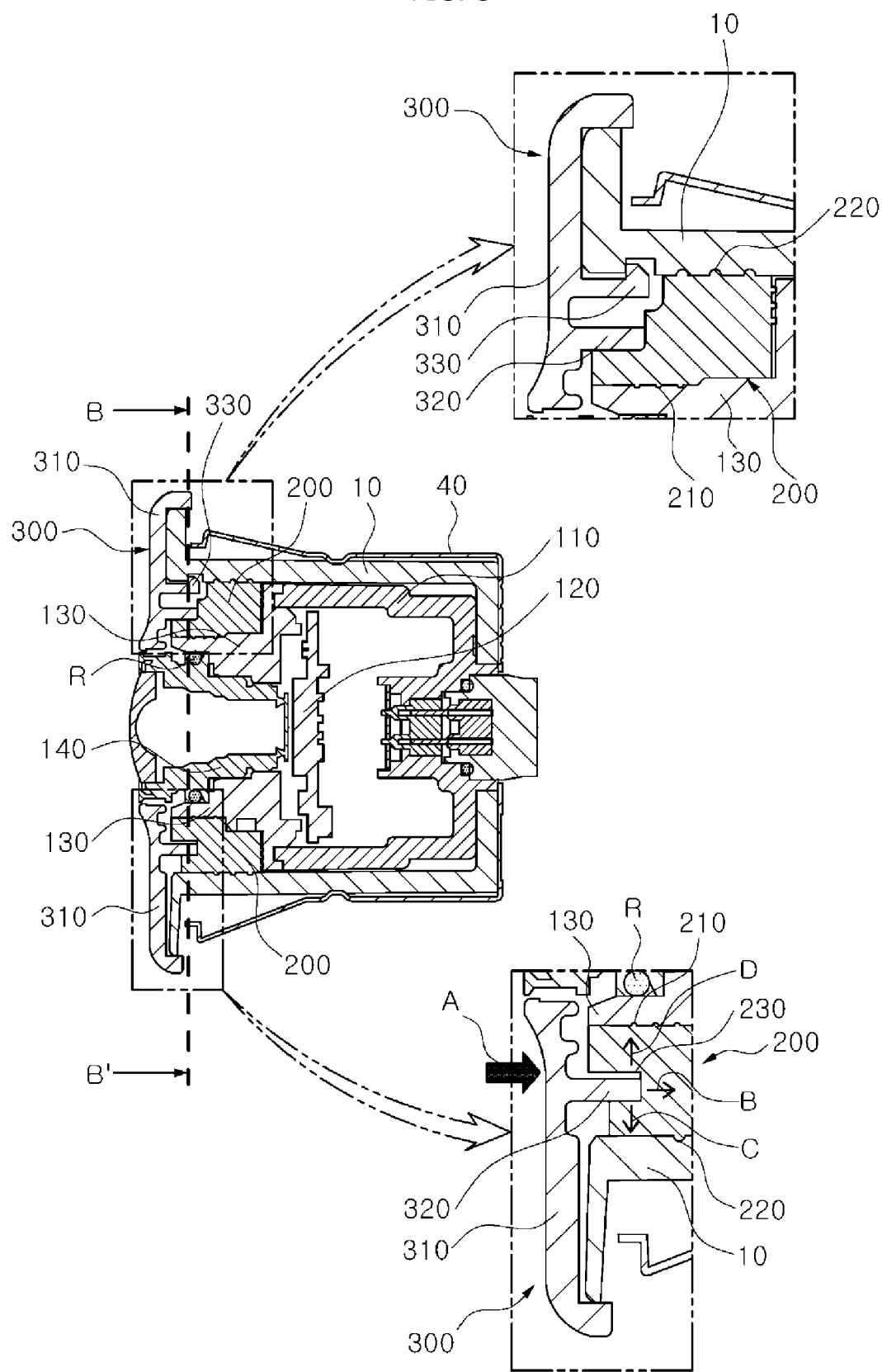
FIG. 3 is a sectional view taken along line A-A' of FIG. 1.
Figure 4:
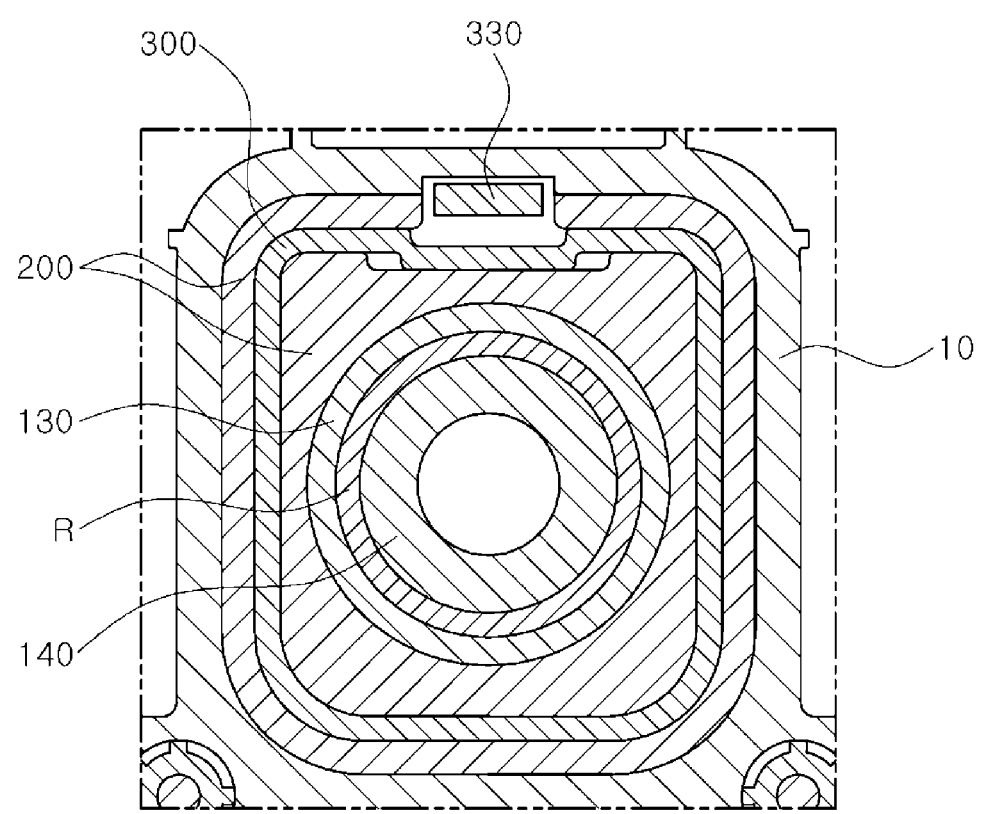
FIG. 4 is a sectional view taken along line B-B' of FIG. 3.

FIG. 1 is a perspective view schematically illustrating a camera device for a vehicle according to an embodiment of the present disclosure. FIG. 2 is an exploded perspective view schematically illustrating the camera device for a vehicle according to the embodiment of the present disclosure. FIG. 3 is a sectional view taken along line A-A' of FIG. 1. FIG. 4 is a sectional view taken along line B-B' of FIG. 3

Referring to FIGS. 1 to 4, a camera device for a vehicle according to an embodiment of the present disclosure includes a camera module 100 that is seated in a housing 10, a grommet 200 that is installed such that an inner circumferential surface thereof comes into contact with the camera module 100 and an outer circumferential surface thereof comes into contact with the housing 10, and a cover 300 that is coupled to the housing 10 and the grommet 200 and prevents penetration of moisture along with the grommet 200.

As illustrated in FIG. 3, the camera device for a vehicle according to the embodiment of the present disclosure can obtain an effect of enabling a size of a contour of the camera device for a vehicle to be reduced because the grommet 200 is installed in the front of the camera module 100 and at a position adjacent to the cover 300.

This configuration is a distinguished advantage when compared to a structure of a conventional camera device for a vehicle in which a size of a contour thereof cannot be reduced because a grommet is installed in the rear of a camera module 100, namely, around a portion at which a cable module 30 is installed.

The housing 10 is formed in a cuboidal shape in which one side thereof is open. A pad 20 is coupled onto one side of the housing 10, and a cable module 30 is coupled onto the other side of the housing 10. A fixing clip 40 is installed to surround the housing 10. A holder 50 is installed on both left and right sides of the housing 10, and is installed on a vehicle body.

The camera module 100 includes a rear body 110 that is inserted into the housing 10 and is formed in an approximately cuboidal shape in which one side thereof is open, a printed circuit board 120, a front body 130 that is disposed in front of the printed circuit board 120, is coupled to the rear body 110, and is inserted into the grommet 200, and a lens 140 that is inserted into the front body 130.

The printed circuit board 120 preferably includes a flexible printed circuit board (FPCB), is coupled to the front body 130 by bonding, and is connected to the cable module 30 inside the rear body 110.

The printed circuit board 120 is inserted into the rear body 110, and an edge section of the front body 130 is coupled to the rear body 110.

The front body 130 is formed in a hollow body to be able to house the lens 140 in a central portion thereof.

The grommet 200 is formed of a synthetic resin material having elasticity, and prevents penetration of moisture through an adhesion action.

The grommet 200 includes an edge section formed in a quadrilateral shape, and a central section in which a circular hole is formed.

A plurality of first adhesion protrusions 210, which come into contact with an outer circumferential surface of the front body 130 and prevent the penetration of moisture, are formed on an inner circumferential surface of the grommet 200, namely, in the central section in which a circular hole is formed.

A plurality of second adhesion protrusions 220, which come into contact with an inner circumferential surface of the housing 10 and prevent the penetration of moisture, are formed on an outer circumferential surface of the grommet 200, namely, in the edge section formed in a quadrilateral shape.

An insertion groove 230 into which a hydraulic transmission protrusion 320 of the cover 300 (to be described below) is inserted is formed on one side of the grommet 200.

The cover 300 includes a cover body 310 that covers the front of the housing 10, the hydraulic transmission protrusion 320 that is formed to protrude from the cover body 310 in a direction in which it faces the housing 10 and is coupled into the insertion groove 230 formed in the grommet 200, and a hook 330 that is formed apart from the hydraulic transmission protrusion 320 by a constant distance, protrudes from the cover body 310, and is hooked on the housing 10.

The hydraulic transmission protrusion 320 is formed in an approximately cylindrical shape, and comes into contact with the grommet 200 in a circular shape.

In a case where the hydraulic transmission protrusion 320 comes into contact with the grommet 200 and a high hydraulic pressure is applied to the cover 300, the hydraulic transmission protrusion 320 transmits the hydraulic pressure applied to the cover 300 to the grommet 200, and raises adhesion of the first and second adhesion protrusions 210 and 220 of the grommet 200.

That is, as illustrated in FIG. 3, when a hydraulic pressure is applied outside the cover 300 in a direction of an arrow A, the hydraulic transmission protrusion 320 presses the grommet 200 in a direction of an arrow B, and the pressed grommet 200 is deformed in directions of arrows C and D, so that an adhesion force by which the first adhesion protrusions 210 come into contact with the outer circumferential surface of the front body 130 is raised, and an adhesion force by which the second adhesion protrusions 220 come into contact with the inner circumferential surface of the housing 10 is raised.

Therefore, an effect of preventing the penetration of moisture in an environment in which a high hydraulic pressure is applied is further raised.

Meanwhile, an O-ring R for preventing the penetration of moisture may be further installed between the front body 130 and the lens 140. Due to the installation of the O-ring R, the effect of preventing the penetration of moisture can be still further raised.

As described above, according to the present disclosure, it is possible to directly obstruct an inflow of moisture and reduce a size of the contour of the camera device for a vehicle by applying the grommet to the front of the camera device.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A camera device for a vehicle comprising:
   a camera module seated in a housing;
   a grommet installed such that an inner circumferential surface thereof comes into contact with the camera module and an outer circumferential surface thereof comes into contact with the housing; and
   a cover coupled to the housing and the grommet and configured to prevent penetration of moisture along with the grommet,
   wherein:
   the camera module comprises:
      a rear body inserted into the housing;
      a printed circuit board installed on the rear body;
      a front body disposed in front of the printed circuit board, coupled to the rear body, and inserted into the grommet; and
      a lens inserted into the front body;
   one or more first adhesion protrusions, which come into contact with an outer circumferential surface of the front body and prevent penetration of moisture, are formed on the inner circumferential surface of the grommet;
   one or more second adhesion protrusions, which come into contact with an inner circumferential surface of the housing and prevent the penetration of moisture, are formed on the outer circumferential surface of the grommet;
   the cover comprises:
      a cover body configured to cover the housing;
      a hydraulic transmission protrusion formed to protrude from the cover body and coupled into the grommet; and
      a hook formed to protrude from the hydraulic transmission protrusion and coupled to the housing;
   the hydraulic transmission protrusion transmits a hydraulic pressure applied to the cover to the grommet, and raises adhesion of the first and second adhesion protrusions of the grommet; and
   the hydraulic transmission protrusion is formed in an approximately cylindrical shape, and comes into contact with the grommet in a circular shape.

2. The camera device for a vehicle according to claim 1, wherein the printed circuit board is coupled to the front body by bonding, and is connected to a cable module in the rear body.

3. The camera device for a vehicle according to claim 1, wherein the printed circuit board is inserted into the rear body, and an edge section of the front body is coupled to the rear body.

4. The camera device for a vehicle according to claim 1, wherein the lens is housed in a central hollow portion of the front body.

5. The camera device for a vehicle according to claim 1, wherein the inner circumferential surface of the grommet has a circular hole formed in a central portion of the grommet.

6. The camera device for a vehicle according to claim 1, wherein an O-ring, which prevents penetration of moisture, is installed between the front body and the lens.

7. The camera device for a vehicle according to claim 1, wherein the grommet is installed in the front of the camera module.

* * * * *